US012711337B2

(12) United States Patent
Boham

(10) Patent No.: US 12,711,337 B2
(45) Date of Patent: Aug. 18, 2026

(54) AEROSOL PROVISION DEVICE

(71) Applicant: Nicoventures Trading Limited, London (GB)

(72) Inventor: Scott George Boham, London (GB)

(73) Assignee: Nicoventures Trading Limited, London (GB)

( * ) Notice: Subject to any disclaimer, the term of this patent is extended or adjusted under 35 U.S.C. 154(b) by 392 days.

(21) Appl. No.: 18/247,660

(22) PCT Filed: Sep. 28, 2021

(86) PCT No.: PCT/GB2021/052513
§ 371 (c)(1),
(2) Date: Apr. 3, 2023

(87) PCT Pub. No.: WO2022/069880
PCT Pub. Date: Apr. 7, 2022

(65) Prior Publication Data

US 2023/0394260 A1 Dec. 7, 2023

(30) Foreign Application Priority Data

Oct. 2, 2020 (GB) ..................................... 2015680

(51) Int. Cl.

*G06K 19/06* (2006.01)
*G06K 7/10* (2006.01)
*G06K 7/14* (2006.01)

(52) U.S. Cl.

CPC ....... *G06K 7/10722* (2013.01); *G06K 7/1413* (2013.01); *G06K 7/1417* (2013.01)

(58) Field of Classification Search

CPC ......... G06K 19/07749; G06K 7/10722; G06K 7/1413; G06K 7/1417; G06K 7/10316

(Continued)

(56) References Cited

U.S. PATENT DOCUMENTS 9,854,842 B2 1/2018 Liu
9,955,733 B2 5/2018 Sur et al.

(Continued)

FOREIGN PATENT DOCUMENTS

CN 204888726 U 12/2015
DE 102018120547 A1 2/2020

(Continued)

OTHER PUBLICATIONS

"Help with Scan & Go", Available at: <https://web.archive.org/web/20200503092601/https://help.samsclub.com/app/answers/detail/a_id/2845/~/help-with-scan-%26-go>, May 3, 2020, pp. 1-9.

(Continued)

*Primary Examiner* — Daniel St Cyr
(74) *Attorney, Agent, or Firm* — MERCHANT & GOULD P.C.

(57) ABSTRACT

An aerosol provision device for an aerosol provision system comprises an interface configured to receive a consumable for the aerosol provision system, a camera configured to image a surface of the consumable and control circuitry. The control circuitry is configured to instruct the camera to capture an image of the surface of the consumable in response to the consumable being received by the interface, and send data associated with the image to a remote computing device.

20 Claims, 7 Drawing Sheets

(58) Field of Classification Search
USPC .................................................... 235/462.11
See application file for complete search history.

(56) References Cited

U.S. PATENT DOCUMENTS

| | | | | |
|---|---|---|---|---|
| 10,304,306 | B2 | 5/2019 | Mills et al. | |
| 12,133,559 | B2 * | 11/2024 | Daugherty | A24F 40/51 |
| 2013/0284192 | A1 | 10/2013 | Peleg et al. | |
| 2014/0234949 | A1 * | 8/2014 | Wasson | B01L 3/0275 422/519 |
| 2014/0246035 | A1 * | 9/2014 | Minskoff | A24F 40/65 131/329 |
| 2016/0345628 | A1 | 12/2016 | Sabet | |
| 2017/0188627 | A1 | 7/2017 | Sur | |
| 2018/0060873 | A1 | 3/2018 | Chu | |
| 2018/0271149 | A1 | 9/2018 | Holtz et al. | |
| 2019/0000144 | A1 | 1/2019 | Bless et al. | |
| 2019/0008206 | A1 | 1/2019 | Gimkiewicz et al. | |
| 2019/0158938 | A1 | 5/2019 | Bowen et al. | |
| 2020/0000143 | A1 | 1/2020 | Anderson et al. | |
| 2020/0281254 | A1 | 9/2020 | Rogan | |
| 2020/0315260 | A1 * | 10/2020 | Hubbard | A24F 40/65 |
| 2021/0298363 | A1 * | 9/2021 | Daugherty | A24F 40/60 |
| 2021/0319494 | A1 | 10/2021 | Hashimoto | |
| 2022/0117314 | A1 * | 4/2022 | Daugherty | G06F 21/34 |

FOREIGN PATENT DOCUMENTS

| | | | |
|---|---|---|---|
| JP | 2018055304 | A | 4/2018 |
| JP | 2018527894 | A | 9/2018 |
| JP | 2020525025 | A | 8/2020 |
| JP | 2021516538 | A | 7/2021 |
| WO | 2016094885 | A1 | 6/2016 |
| WO | 2016191946 | A1 | 12/2016 |
| WO | 2019185747 | A1 | 10/2019 |
| WO | 2019186158 | A1 | 10/2019 |
| WO | 2020136866 | A1 | 7/2020 |

OTHER PUBLICATIONS

International Preliminary Report on Patentability received for PCT Patent Application No. PCT/GB2021/052513, mailed on Aug. 26, 2022, 7 Pages.

International Search Report and Written Opinion received for PCT Patent Application No. PCT/GB2021/052513, mailed on Dec. 21, 2021, 13 Pages.

"Reasons for Refusal received for Japanese Patent Application No. 2023-519829, mailed on Jun. 4, 2024", 4 pages (2 pages of English Translation and 2 pages of Official Copy).

"Search Report received for Japanese Patent Application No. 2023-519829 mailed on May 29, 2024", 37 pages (20 pages of English Translation and 17 pages of Official Copy).

Chinese Office Action with Search Report in Application No. 2021800756534, dated Jun. 6, 2026, 22 pages (9 pages English Translation, 13 pages Official).

* cited by examiner

AEROSOL PROVISION DEVICE

PRIORITY CLAIM

The present application is a National Phase entry of PCT Application No. PCT/GB2021/052513, filed Sep. 28, 2021, which claims priority from GB Application No. 2015680.8, filed Oct. 2, 2020, each of which hereby fully incorporated herein by reference.

TECHNICAL FIELD

The present disclosure relates to an aerosol provision device for an aerosol provision system, a method of imaging a consumable for an aerosol provision system and an aerosol provision system.

BACKGROUND

Electronic aerosol provision systems such as electronic cigarettes (e-cigarettes) generally contain an aerosol-generating material, such as a reservoir of a source liquid containing a formulation, typically including nicotine, or a solid material such as a tobacco-based product, from which an aerosol is generated for inhalation by a user, for example through heat vaporization. Thus, an aerosol provision system will typically comprise an aerosol generator, e.g. a heating element, arranged to aerosolize a portion of aerosol-generating material to generate an aerosol in an aerosol generation region of an air channel through the aerosol provision system. As a user inhales on the device and electrical power is supplied to the aerosol generator, air is drawn into the device through one or more inlet holes and along the air channel to the aerosol generation region, where the air mixes with the vaporized aerosol generator and forms a condensation aerosol. The air drawn through the aerosol generation region continues along the air channel to a mouthpiece, carrying some of the aerosol with it, and out through the mouthpiece for inhalation by the user.

It is common for aerosol provision systems to comprise a modular assembly, often having two main functional parts, namely an aerosol provision device and a consumable. Typically the consumable will comprise the consumable aerosol-generating material and the aerosol generator (heating element), while the aerosol provision device part will comprise longer-life items, such as a rechargeable battery, device control circuitry and user interface features. The aerosol provision device may also be referred to as a reusable part or battery section and the consumable may also be referred to as an article, disposable/replaceable part, cartridge or cartomizer.

The aerosol provision device and consumable are mechanically coupled together at an interface for use, for example using a screw thread, bayonet, latched or friction fit fixing.

When the aerosol-generating material in an consumable has been exhausted, or the user wishes to switch to a different consumable having a different aerosol-generating material, the consumable may be removed from the aerosol provision device and a replacement consumable may be attached to the device in its place.

In order to ensure the safe and reliable operation of the aerosol provision system, it is recommended to use components, such as the aerosol provision device and consumable, that are produced by an approved or recommended manufacturer. Components manufactured by other parties may be produced to a lower standard and may cause harm or damage to the other components or the user when used as part of the aerosol provision system. As the aerosol provision device is designed to be reused consumable is designed to be removed and replaced, it is important to be able to verify each consumable that it used with the aerosol provision device as part of the aerosol provision system.

Various approaches are described herein which seek to help address or mitigate some of the issues discussed above.

SUMMARY

The disclosure is defined in the appended claims.

In accordance with some embodiments described herein, there is provided an aerosol provision device for an aerosol provision system. The aerosol provision device comprises an interface configured to receive a consumable for the aerosol provision system, a camera configured to image a surface of the consumable and control circuitry. The control circuitry is configured to instruct the camera to capture an image of the surface of the consumable in response to the consumable being received by the interface, and send data associated with the image to a remote computing device.

The camera may be located proximate to the interface.

The control circuitry may be further configured to wait a predetermined time in response to the consumable being received by the interface prior to instructing the camera to capture the image. The predetermined time may be between 10 milliseconds and 2 seconds.

The aerosol provision device may also comprise a light source configured to illuminate the surface of the consumable. The light source may be located proximate to the camera. The control circuitry may be further configured to instruct the light source to activate prior to instructing the camera to capture the image, and the control circuitry may be further configured to wait a predetermined time in response to the consumable being received by the interface prior to instructing the light source to activate. The predetermined time may be between 10 milliseconds and 2 seconds. The control circuitry may be further configured to instruct the light source to deactivate after instructing the camera to capture the image of the surface of the consumable.

The control circuitry may be further configured to repeat the instructing the camera to capture the image one or more times response to an indication that the image has not been successfully read. The control circuitry may be further configured to provide a notification to a user of the aerosol provision device in response to an indication that the image has not been successfully read. The indication may be received from the remote computing device, or the indication may be generated by the control circuitry.

The control circuitry may be further configured to store the data associated with the image in memory associated with the control circuitry.

The control circuitry may be further configured to receive an instruction from the remote computing device in response to the sending of the data associated. The instruction indicates that the consumable is not authentic and/or not approved, and the control circuitry may be further configured to provide a notification to a user of the aerosol provision device in response receiving the instruction indicating that the consumable is not authentic and/or not approved from the remote computing device.

The control circuitry may be further configured to alter an operational parameter of the aerosol provision device in response to receiving the instruction from the remote computing device. The operational parameter may be the enabling of an aerosol generator of the aerosol provision system. The control circuitry may be further configured to enable to the aerosol generator for a number of inhalations by a user of the aerosol provision device in response to receiving the instruction.

The data associated with the image may be sent to the remote computing device via Bluetooth.

In accordance with some embodiments described herein, there is provided a method of imaging a consumable for an aerosol provision system comprising instructing a camera to capture an image of a surface of the consumable in response to the consumable being received by an interface, and sending data associated with the image to a remote computing device.

There is also provided a computer readable storage medium comprising instructions which, when executed by a processor, performs the above method.

In accordance with some embodiments described herein, there is provided an aerosol provision system comprising the aerosol provision device as described herein.

The aerosol provision system may comprise a consumable. The consumable comprises a code on the surface of the consumable.

These aspects and other aspects will be apparent from the following detailed description. In this regard, particular sections of the description are not to be read in isolation from other sections.

BRIEF DESCRIPTION OF DRAWINGS

Embodiments of the disclosure will now be described, by way of example only, with reference to accompanying drawings, in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of consumables and systems discussed herein which are not described in detail may be implemented in accordance with any conventional techniques for implementing such aspects and features.

The present disclosure relates to aerosol provision systems, which may also be referred to as aerosol provision systems, such as e-cigarettes. Throughout the following description the term “e-cigarette” or “electronic cigarette” may sometimes be used, but it will be appreciated this term may be used interchangeably with aerosol provision system and electronic aerosol provision system.

As noted above, aerosol provision systems (e-cigarettes) often comprise a modular assembly including both a reusable part (aerosol provision device) and a replaceable (disposable) or refillable cartridge part, referred to as a consumable. Systems conforming to this type of two-part modular configuration may generally be referred to as two-part systems or devices. It is also common for electronic cigarettes to have a generally elongate shape. For the sake of providing a concrete example, certain embodiments of the disclosure described herein comprise this kind of generally elongate two-part system employing refillable cartridges. However, it will be appreciated the underlying principles described herein may equally be adopted for other electronic cigarette configurations, for example modular systems comprising more than two parts, as devices conforming to other overall shapes, for example based on so-called box-mod high performance devices that typically have a more boxy shape.

As described above, the present disclosure relates to (but it not limited to) refilling devices for consumables of aerosol provision systems, such as e-cigarettes and electronic cigarettes.

Figure 1:
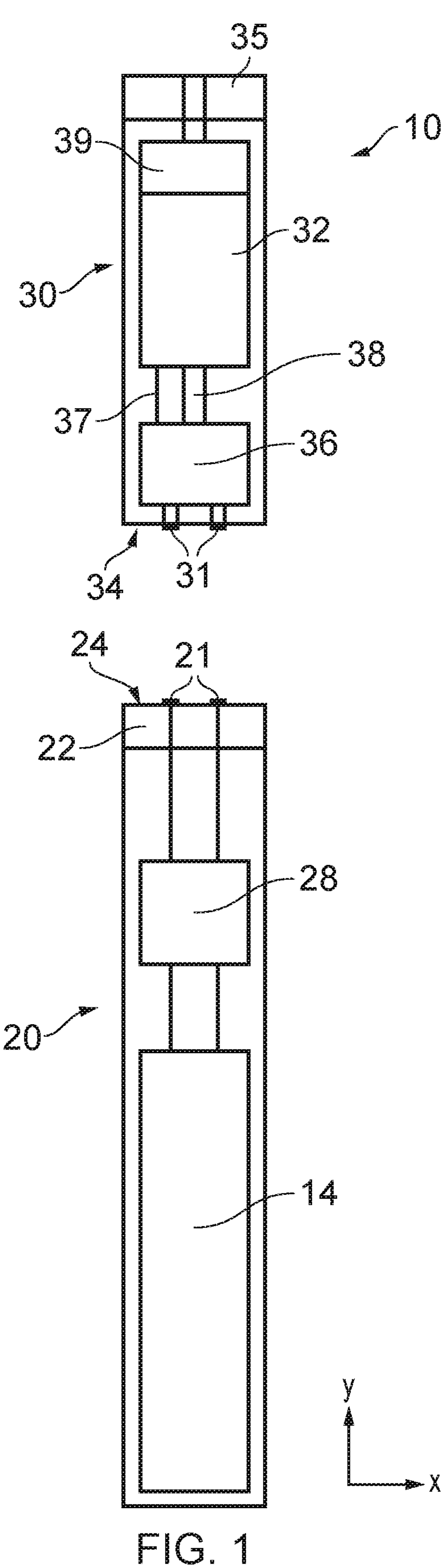
FIG. 1 is a schematic diagram of an aerosol provision system.

FIG. 1 is a highly schematic diagram (not to scale) of an example aerosol provision system 10, such as an e-cigarette, to which embodiments are applicable. The aerosol provision system 10 has a generally cylindrical shape, extending along a longitudinal or y axis as indicated by the axes (although aspects of the disclosure are applicable to e-cigarettes configured in other shapes and arrangements), and comprises two main components, namely an aerosol provision device 20 and a consumable 30.

The consumable 30 comprises or consists of aerosol-generating material 32, part or all of which is intended to be consumed during use by a user. A consumable 30 may comprise one or more other components, such as an aerosol-generating material storage area 39, an aerosol-generating material transfer component 37, an aerosol generation area, a housing, a wrapper, a mouthpiece 35, a filter and/or an aerosol-modifying agent.

A consumable 30 may also comprise an aerosol generator 36, such as a heating element, that emits heat to cause the aerosol-generating material 32 to generate aerosol in use. The aerosol generator 36 may, for example, comprise combustible material, a material heatable by electrical conduction, or a susceptor. It should be noted that it is possible for the aerosol generator 36 to be part of the aerosol provision device 20 and the consumable 30 then may comprise the aerosol-generating material storage area 39 for the aerosol-generating material 32 such that, when the consumable 30 is coupled with the aerosol provision device 20, the aerosol-generating material 32 can be transferred to the aerosol generator 36 in the aerosol provision device 20.

Aerosol-generating material is a material that is capable of generating aerosol, for example when heated, irradiated or energized in any other way. The aerosol-generating material 32 may, for example, be in the form of a solid, liquid or gel which may or may not contain an active substance and/or flavorants. In some embodiments, the aerosol-generating material 32 may comprise an “amorphous solid”, which may alternatively be referred to as a “monolithic solid” (i.e. non-fibrous). In some embodiments, the amorphous solid may be a dried gel. The amorphous solid is a solid material that may retain some fluid, such as liquid, within it. In some embodiments, the aerosol-generating material 32 may for example comprise from about 50 wt %, 60 wt % or 70 wt % of amorphous solid, to about 90 wt %, 95 wt % or 100 wt % of amorphous solid.

The aerosol-generating material comprises one or more ingredients, such as one or more active substances and/or flavorants, one or more aerosol-former materials, and optionally one or more other functional materials such as pH regulators, coloring agents, preservatives, binders, fillers, stabilizers, and/or antioxidants.

The active substance as used herein may be a physiologically active material, which is a material intended to achieve or enhance a physiological response. The active substance may for example be selected from nutraceuticals, nootropics, and psychoactives. The active substance may be naturally occurring or synthetically obtained. The active substance may comprise for example nicotine, caffeine, taurine, theine, vitamins such as B6 or B12 or C, melatonin, cannabinoids, or constituents, derivatives, or combinations thereof. The active substance may comprise one or more constituents, derivatives or extracts of tobacco, cannabis or another botanical.

In some embodiments, the active substance comprises nicotine. In some embodiments, the active substance comprises caffeine, melatonin or vitamin B12.

The aerosol provision device 20 includes a power source 14, such as a battery, configured to supply electrical power to the aerosol generator 36. The power source 14 in this example is rechargeable and may be of a conventional type, for example of the kind normally used in electronic cigarettes and other applications requiring provision of relatively high currents over relatively short periods. The power source 14 may be recharged through the charging port (not illustrated), which may, for example, comprise a USB connector.

The aerosol provision device 20 includes device control circuitry 28 configured to control the operation of the aerosol provision system 10 and provide conventional operating functions in line with the established techniques for controlling aerosol provision systems such as electronic cigarettes. The device control circuitry (processor circuitry) 28 may be considered to logically comprise various sub-units/circuitry elements associated with different aspects of the electronic cigarette's operation. For example, depending on the functionality provided in different implementations, the device control circuitry 28 may comprise power source control circuitry for controlling the supply of electrical power from the power source 14 to the aerosol generator 36, user programming circuitry for establishing configuration settings (e.g. user-defined power settings) in response to user input, as well as other functional units/circuitry associated functionality in accordance with the principles described herein and conventional operating aspects of electronic cigarettes. It will be appreciated the functionality of the device control circuitry 28 can be provided in various different ways, for example using one or more suitably programmed programmable computer(s) and/or one or more suitably configured application-specific integrated circuit(s)/circuitry/chip(s)/chipset(s) configured to provide the desired functionality.

The aerosol provision device 20 has an interface 22 configured to receive the consumable 30, thereby facilitating the coupling between the aerosol provision device 20 and the consumable 30. As illustrated in FIG. 1, the interface 22 is located on a surface 24 of the aerosol provision device 20.

The housing of the consumable 30 has a surface 34 configured to be received by the interface 22 on the aerosol provision device 20 in order to facilitate coupling between the consumable 30 and the aerosol provision device 20. The surface 34 of the consumable may be configured to be a size and/or shape that mirrors the size and/or shape of the interface 22 in order to facilitate coupling between the aerosol provision device 20 and the consumable 30. For example, the interface 22 may comprise a cavity, chamber or other space on the surface 24 of the aerosol provision device 20. The surface 34 of the consumable 30 can then be configured to be a size and shape that mirrors the size and shape of the cavity in order for the surface 34 of the consumable 30 to be inserted into the cavity.

Although not illustrated, the interface 22 of the aerosol provision device 20 and the surface 34 of the consumable 30 may have complementary features to reversibly attach and mate the consumable 30 to the aerosol provision device 20, such as a screw thread, bayonet fitting, latched or friction fit fixing or other fastening means.

The interface 22 also comprises one or more connectors 21, such as contact electrodes, connected via electrical wiring to the control circuitry 28 and the power source 14. The consumable 30 also comprises one or more connectors 31, such as contact electrodes, connected via electrical wiring to the aerosol generator 36. In use, the consumable 30 is received by the interface 22 of the aerosol provision device 20, thereby coupling the aerosol provision device 20 and the consumable 30. This results in the connectors 31 on the consumable 30 mating with the connectors 21 on the aerosol provision device 20, thereby allowing electrical power and electrical current to be supplied from the power source 14 of the aerosol provision device 20 to the aerosol generator 36 of the consumable 30.

The housing of the consumable 30 has a surface 34 configured to engage with an interface 22 on the aerosol provision device 20 in order to facilitate coupling between the consumable 30 and the aerosol provision device 20. In other words, the aerosol provision device 20 is configured to receive the consumable 30, via the interface 22, and the surface 34 of the consumable is proximate to the interface 22 on the aerosol provision device 20 when the consumable 20 is received by the interface 22.

The aerosol provision system 10 includes one or more air inlets (not illustrated), located on one or more of the aerosol provision device 20 and the consumable 30. In use, as a user inhales on the mouthpiece 35, air is drawn into the aerosol provision system 10 through the air inlets and along an air channel 38 to the aerosol generator 36, where the air mixes with the vaporized aerosol-generating material 32 and forms a condensation aerosol. The air drawn through the aerosol generator 36 continues along the air channel 38 to a mouthpiece carrying some of the aerosol with it, and out through the mouthpiece 35 for inhalation by the user.

By way of a concrete example, the consumable 30 comprises a housing (formed, e.g., from a plastics material), an aerosol-generating material storage area 39 formed within the housing for containing the aerosol-generating material 32 (which in this example may be a liquid which may or may not contain nicotine), an aerosol-generating material transfer component 37 (which in this example is a wick formed of e.g., glass or cotton fibers, or a ceramic material configured to transport the liquid from the reservoir using capillary action), an aerosol-generating area containing the aerosol generator 36, and a mouthpiece 35. Although not shown, a filter and/or aerosol modifying agent (such as a flavor imparting material) may be located in, or in proximity to, the mouthpiece 35. The aerosol generator 36 of this example comprises a heater element formed from an electrically resistive material (such as NiCr8020) spirally wrapped around the aerosol-generating material transfer component 37, and located in an air channel 38. The area around the heating element and wick combination is the aerosol-generating area of the consumable 30.

Figure 2:
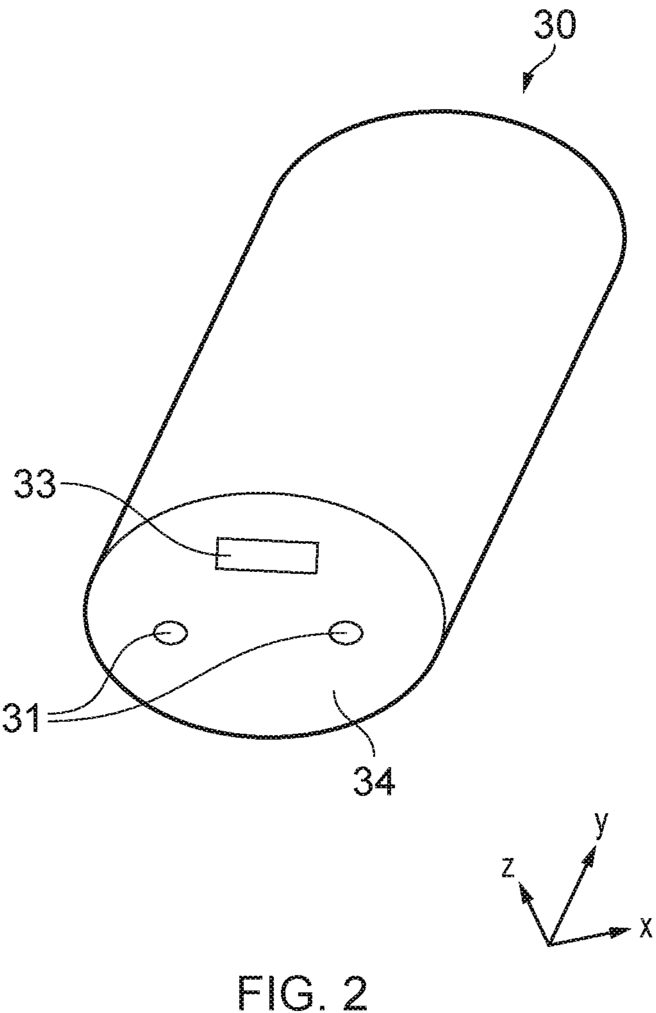
FIG. 2 is a schematic diagram of an example consumable for use in the aerosol provision system illustrated in FIG. 1.

FIG. 2 is a schematic diagram of an example consumable 30 for use in the aerosol provision system 10 illustrated in FIG. 1, where the same reference signs have been used for like elements between the consumable 30 illustrated in FIG. 1 and the consumable 30 illustrated in FIG. 2.

As described above, the consumable 30 has a surface 34 configured to be received by the interface 22 of the aerosol provision device 20. The one or more connectors 31 of the consumable are located on the surface 34 of the consumable in order to facilitating mating with the connectors 21 on the aerosol provision device 20 as described above. The consumable illustrated in FIG. 2 also comprises a code 33, for example located on the surface 34 of the consumable 30. In this case, the code 33 may be printed, etched, glued or otherwise adhered to the surface 34 of the consumable.

The code 33 is generated or otherwise encoded with consumable data and a digital signature. The digital signature is generated using a private key of a key pair. The private key is held by the manufacturer of the consumable 30, or by the entity responsible for generating and printing the code 33 on the consumable 30. The private key is not distributed further.

The consumable data represents information associated with the consumable 30. In some examples, the consumable data includes an identifier for the consumable 30, such as a serial number or other means of uniquely identifying the consumable 30. This results in the code 33 on the consumable 30 being unique to the consumable 30 it is present on.

The consumable data can also include a stock keeping unit (SKU) for the consumable 30. The SKU may contain additional information associated with the consumable 30, such as a date of manufacture and/or expiry of the article 30, a type of the article 30, a batch number of the article 30, and/or one or more types of aerosol provision device 20 the article 30 is configured to be used with. The SKU may also contain data relating to the aerosol-generating material 32, such an amount of aerosol-generating material 32 stored in the aerosol-generating material storage area 39, one or more ingredients, one or more active substances, the concentration and/or amount of the ingredients, active substances and/or one or more flavorants within the aerosol-generating material 32.

The code 33 is generated by conventional means based on the particular implementation and type of code 33 used. The code 33 on the consumable 30 may be a one dimensional (1D) or linear code, such as a barcode, a two-dimensional (2D) code or matrix code, such as an Azte code, data matrix or QR code, or a three-dimensional (3D) code, such as a 3D barcode or a colored QR code.

The size of the code is dependent upon the size and amount of data contained within the consumable data and the digital signature. For example, the identifier for the consumable could be implemented as 24 bits, thereby allowing for approximately 16.7 million unique identifiers and consumables 30. The SKU could be implemented as 16 bits, for example allowing a combination of 4 different active substances, 8 different concentrations of ingredient, 50 different flavorants and 20 different types of consumable 30 and/or aerosol provision device 20 to be represented in the SKU. The digital signature could then be implemented as 16 bits, given a total size of 56 bits (or seven 8-bit characters) for the code 33. This could then be represented, for example, on a 12×12 data matrix (with physical dimensions of between 2 mm square and 5 mm square) or a 3 cm square QR code. It will be appreciated, however, that the code may be smaller or larger depending on the amount of data contained within the consumable data and the digital signature.

Figure 3:
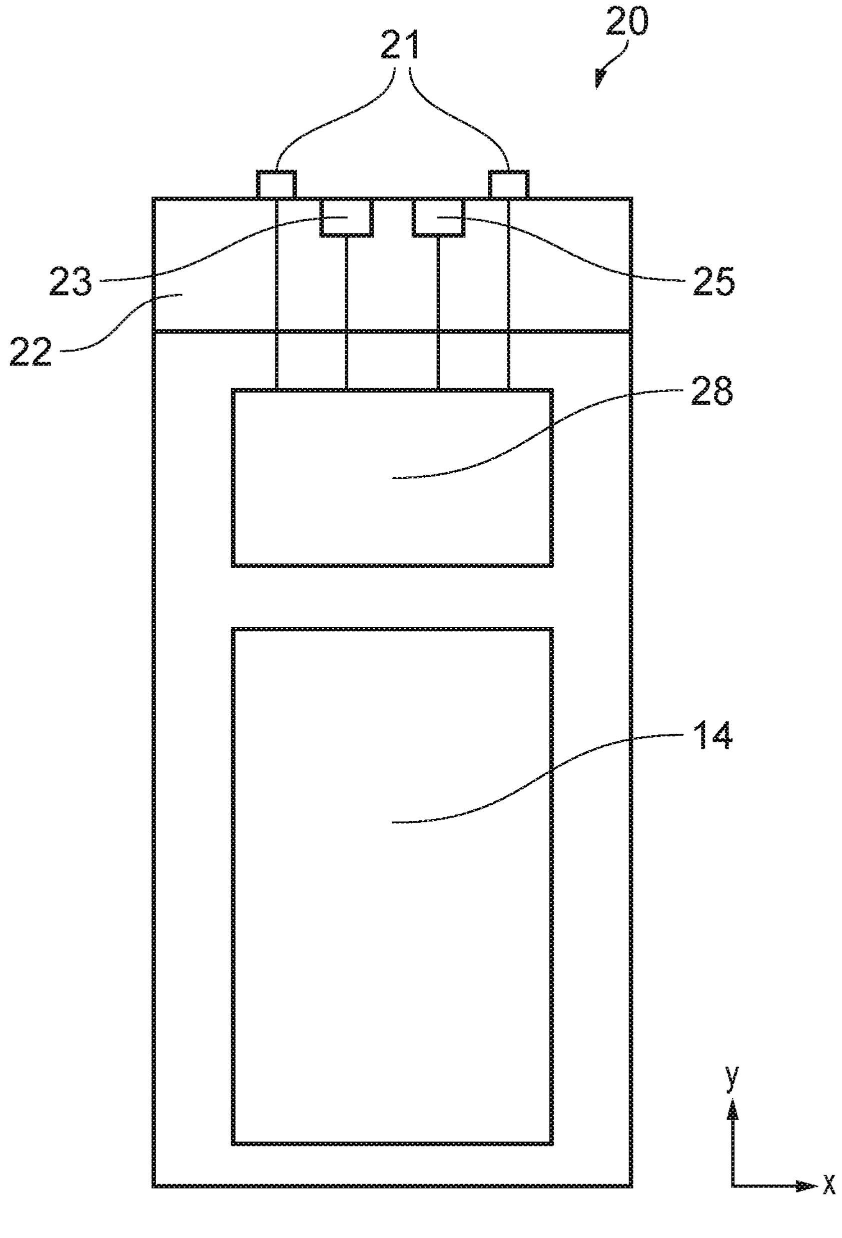
FIG. 3 is a schematic diagram of an example aerosol provision device for use in the aerosol provision system illustrated in FIG. 1.

FIG. 3 is a schematic diagram of an example aerosol provision device 20 for use in the aerosol provision system 10 illustrated in FIG. 1, where the same reference signs have been used for like elements between the aerosol provision device 20 illustrated in FIG. 1 and the aerosol provision device 20 illustrated in FIG. 3.

The aerosol provision device 20 illustrated in FIG. 3 comprises a camera 23 configured to image a surface of the consumable 30. As illustrated in FIG. 3, the camera 23 can be located proximate to the interface 22 such that the camera images the surface 34 of the consumable 30 comprising the code 33 when the consumable is received by the interface. For example, the camera 23 may be located on the same surface 24 of the aerosol provision device 20 as the interface 22. Alternatively or in addition, the camera 23 may be located on a portion of the interface 22, such that the camera 23 forms part of the interface 22. In the example described above where the interface 22 comprises a cavity, the camera 23 can be located within the cavity, for example on a side wall or base wall of the cavity, such that the camera 23 is configured to image the surface 34 of the consumable 30 when the surface 34 of the consumable 30 is inserted into the cavity. It will be appreciated, however, that it is not essential for the camera 23 to form part of the interface 22, and the camera 23 can be located anywhere on the aerosol provision device 20 that allows the camera 23 to image the surface of the consumable 30.

The camera 23 may comprise an image sensor, such as a CCD or CMOS image sensor, in order to capture an image and convert the image into corresponding image data. The image sensor may have a resolution of between 1 megapixel and 10 megapixels, for example 2 megapixels or 5 megapixels. The camera 23 may also include one or more lenses arranged to focus the incoming light onto the image sensor. The one or more lenses and image sensor may be selected in order to reduce the overall dimensions of the camera 23, thereby allowing the camera 23 to be contained within a smaller area. For example, the focal length, aperture and/or f-number of the lenses may be selected to reduce the separation required between the lenses and the image sensor, thereby reducing the length of the camera in the imaging direction. For example, the focal length of the lens may be between 1 and 4 mm, such as 1.4 mm, and the local distance between the lens and the image sensor less than 2 mm. The image sensor may have dimensions of less than 5 mm in each direction, such as 2 mm×1.4 mm×1.95 mm, such that the overall dimensions of the camera 23 are no greater than 5 mm×5 mm×5 mm. This allows the camera 23 to be located in the aerosol provision 20 without adversely impacting the space available for the power source 14.

The camera 23 may be located on the aerosol provision device 20 such that the image sensor and the one or more lenses are aligned with the code 33 on the surface 34 of the consumable 30 in order to reduce the field of view required by the camera 23 in order to include the code 33 within the captured image. For example, the imaging direction of the camera 23 (in other words the alignment direction of the image sensor and the one or more lens) may be parallel to the y-axis in FIGS. 1 to 3. The code 33 may then be located on the surface 34 of the consumable 30 such that the code 33 is collinear (in axial alignment) with the imaging direction of the camera 23 when the consumable 30 is received by the interface 22 of the aerosol provision device 20. In some examples, the surface 34 of the consumable is planar and perpendicular to the imaging direction of the camera 23, such that the code is perpendicular to the imaging direction of the camera 23, thereby improving the quality and resolution of the code 33 in the image captured by the camera 23. It will be appreciated, however, that these configurations are not essential, and the camera 23 can be configured such that the entire surface 34 of the consumable 30 is within the field of view of the camera 23, such that the image captured by the camera 23 will contain the code 33 regardless of the position of the code 33 on the surface 34 of the consumable 30.

The aerosol provision device 20 illustrated in FIG. 3 also comprises a light source such as an LED, incandescent bulb, or Compact Fluorescent Lamp (CFL). Although illustrated as a separate component in FIG. 3, in some embodiments the light source 25 and the camera 23 are integrated to form a single component. For example, the light source 25 may comprise an LED on the image sensor of the camera 23. The light source 25 is configured to illuminate the surface 34 of the consumable 30 imaged by the camera 23, thereby improving the lighting of the surface 34 and the resulting image captured by the camera. The surface 34 of the consumable 30 may be substantially or entirely dark or in shadow when the consumable 30 is received by the interface 22. The light source 35 therefore provides a means of illuminating the surface 34. As illustrated in FIG. 3, the light source 25 is located proximate to the camera 23, but this is not essential. It will be appreciated that the light source 25 can be located anywhere on the aerosol provision device 20 that allows the light source 25 to illuminate the surface 34 of the consumable 30. The light source 25 may also form part of the interface 22. In the example described above where the interface 22 comprises a cavity, the light source 25 can be located within the cavity, for example on a side wall or base wall of the cavity, such that the light source 25 is configured to illuminate the surface 34 of the consumable 30 when the surface 34 of the consumable 30 is inserted into the cavity. As described above, the light source 25 may be located proximate to the camera 23, for example on the same wall of the cavity as the camera 23, or on a wall adjacent or opposite the wall the camera 23 is located on.

As described above, the control circuitry 28 is configured to control the operation of the aerosol provision system 10. The control circuitry 28 is configured to communicate with the camera 23 and the light source 25, such as via a serial peripheral interface (SPI), thereby allowing the control circuitry 28 to control the operation of the camera 23 and the light source 25.

The control circuitry 28 is configured to instruct the camera 23 to capture an image of the surface 34 of the consumable 30 in response to the consumable 30 being received by the interface 22 of the aerosol provision device 20.

The control circuitry 28 may be configured to detect that the consumable 30 has been received by the interface 22, for example by detecting the mating of one or more of the connectors 31 on the consumable 30 with the connectors 21 on the aerosol provision device or by detecting when a securing latch, catch or other attachment means of the interface 22 has been engaged or through the use of a sensing means such as a light sensor or pressure sensor. For example, when the consumable 30 is separate from the aerosol provision device the connectors 21 on the aerosol provision device 20 may form an open circuit. When the consumable 30 is received by the interface 22, the mating of the connectors 31 on the consumable 30 with the connectors 21 on the aerosol provision device 20 completes an electrical circuit between the power source 14 and the aerosol generator 36. The control circuitry 28 can be configured to detect this electrical circuit being completed, closed or otherwise formed, thereby allowing the control circuitry 28 to detect that the consumable 30 has been received by the interface 22. In response to detecting that the consumable 30 has been received by the interface 22, the control circuitry 28 is configured to instruct the camera 23 to capture an image of the surface 34 of the consumable 30.

As illustrated in the FIG. 3, the aerosol provision system 20 can also comprise a light source 25. The control circuitry 28 is configured to instruct the light source 25 to activate prior to instructing the camera 23 to capture the image. In other words, the control circuitry 28 instructs the light source to turn on and provide light before the camera 23 captures the image, such that the image captured by the camera 23 is illuminated by the light source 25. The control circuitry 28 may be configured to instruct the light source 25 to activate less than a second before instructing the camera to capture 23 the image, for example 0.5 seconds or 1 millisecond. Alternatively, the control circuitry 28 may instruct the light source 25 to activate at the same time as instructing the camera 23 capture the image in examples where the response time of the light source 25 is quicker than the camera 23 (in other words, the light source 25 activates prior to the camera 23 capturing the image even though the instructions were sent at the same time). The control circuitry 28 can then instruct the light source 25 to deactivate or turn off after instructing the camera 23 to capture the image (in other words after the camera 23 has captured the image), thereby reducing the power consumption of the light source 23. For example, the control circuitry 28 may instruct the light source 25 to deactivate in response to receiving the image data from the camera 23. Alternatively, the control circuitry 28 can be configured to activate for a fixed period of time, such as 1, 50 or 500 milliseconds, or a period of time corresponding to the shutter speed or exposure time of the camera 23.

In some embodiments, the control circuitry 28 is configured to wait a predetermined time in response to the consumable 30 being received by the interface 22 prior to instructing the camera 23 to capture the image. In embodiments where the aerosol provision device 20 comprises a light source 25, the control circuitry 28 can be configured to wait a predetermined period of time in response to the consumable 30 being received by the interface 22 prior to instructing the light source 25 to activate. In other words, in response to the consumable 30 being received by the interface 22, for example by the control circuitry 28 detecting that the consumable 30 has been received by the interface 22, the control circuitry 28 is configured to wait a predetermined time before instructing either the light source 25 to activate or the camera 23 to capture an image. Waiting the predetermined time ensures that any vibration or movement due to or caused by the consumable 30 being received by the interface 22 has ceased or subsided, thereby improving the quality of the image captured by the camera 23 as motion blur in the image is reduced. The predetermined time may be less than 5 seconds, such between 10 milliseconds and 2 seconds, for example 50 milliseconds, 500 milliseconds or one second.

As described above, the camera 23 captures an image of the surface 34 of the consumable 30 using conventional techniques, such as using a CCD or CMOS image sensor. The camera 23 is configured to convert the captured image into image data, and the control circuitry 28 is configured to receive the image data for the image from the camera 23. In the example illustrated in FIG. 2, the surface 34 of the consumable 30 comprises a code 30, such that the image captured by the camera (and the corresponding image data) contains the code.

Figure 4:
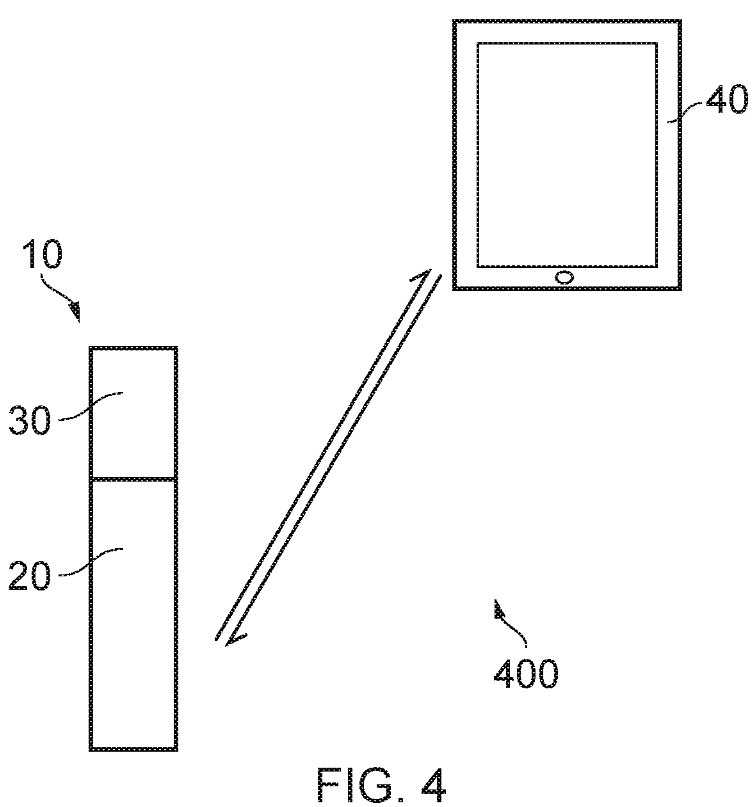
FIG. 4 is a schematic diagram of a system including an aerosol provision device.

FIG. 4 is a schematic diagram of a system 400 including the aerosol provision device 20. The system 400 comprises the aerosol provision device 20 and a remote computing device 40. The aerosol provision device 20 is configured to communicate with the remote computing device 40 using a wireless communication protocol, such as Wi-Fi, Bluetooth, or using a cellular network. The remote computing device 40 may include any suitable electronic device that can be communicatively coupled to the aerosol provision device 20. For example, the remote computing device 40 may include a mobile device (such as a smartphone), a PDA, a personal computer, laptop, tablet, smartwatch, etc.

The control circuitry 28 is configured to send data associated with the image to the remote computing device 40. The data associated with the image may correspond to the image data received by the control circuitry 28 from the camera 23, or the data associated with the image may correspond to the result of one or more calculations performed by the control circuitry 28 on the image data. The control circuitry 28 may also be configured to store the image data and/or the data associated with the image in memory associated with the control circuitry 28, either before or after sending the data associated with the image to the remote computing device 40.

The control circuitry 28 can be configured to repeat instructing the camera 23 to capture an image one or more times in response to an indication that the image data has not been successfully read.

The indication may be generated by the control circuitry 28. In this case, in response to receiving the image data for the image from the camera 23, the control circuitry 28 is configured to attempt to read the image data, and generate an indication if the attempt to read the image data is not successful. Attempting to read the image data may involve performing one or more calculations on the image data, such as identifying or locating a code 33 within the image and decoding the code identified in the image in order to generate numerical values corresponding to the consumable data and digital signature described above. If these calculations are not successful, e.g. a code could not be identified or located in the image or the code could not be decoded, then the control circuitry 28 is configured to generate the indication. The indication may identify the particular calculation that was not successful, or the notification may simply identify that the image data could not be read. In this case, the data associated with the image may only be sent to the remote computing device 40 when the image data is successfully read, and the data associated with the image may correspond to the result of the one or more calculations performed by the control circuitry 28, or the data associated with the image may also include the image data itself.

Alternatively, the indication may be received by the control circuitry 28 from the remote computing device 40. In this case, the data associated with the image sent by the control circuitry 28 to the remote computing device 40 corresponds to the image data. The remote computing device 40 then attempts to read the image data as described above, and sends a notification to the control circuitry 28 indicating that the attempt to read the image data was not successful. In response to receiving the indication, the control circuitry 28 is configured to repeat instructing the camera 23 to capture an image as in the case described above where in the control circuitry 28 generates the indication.

The control circuitry 28 may also be configured to repeat other operations as well as instructing the camera to capture an image one or more times in response to the indication that the image data has not been successfully read.

In embodiments where the aerosol provision device 20 comprises a light source 25, the operation of instructing the light source 25 to activate can be repeated one or more times along with instructing the camera to capture an image and receiving the image data for the image from the camera 23. Equally, in the case described above where the indication may be received by the control circuitry 28 from the remote computing device 40, the operation of sending data associated with the image to the remote data store can be repeated one or more times along with instructing the camera to capture an image and receiving the image data for the image from the camera 23.

In each case, the number of times the operations (for example instructing the camera 23 to capture an image and receiving image data for the image from the camera 23) are repeated may be dependent upon the number of times the image data has not been successfully read. The operations may be repeated up to a predetermined number of times, for example 2, 5 or 10, before alternative action is taken. In other words, in response to an indication that the image data has not been successfully read, the control circuitry 28 can be configured to determine the number of times that the operations (for example instructing the camera 23 to capture an image and receiving image data for the image from the camera 23) have previously been performed. The control circuitry then compares the number of times that the operations have previously been performed to the predetermined number of times in order to determine whether to perform the operations again. For example, if the number of times that the operations have previously been performed is less than the predetermined number of times, the control circuitry is configured 28 to repeat the operations.

If the number of times that the operations have previously been performed is greater than or equal to the predetermined number of times, the control circuitry 28 is configured to perform a different action, such as provide a notification to the user of the aerosol provision device 20. Alternatively, the control circuitry 28 may be configured to provide a notification to the user of the aerosol provision device 20 in response to the indication that the image data has not been successfully read without repeating the objections.

The notification may be provided to the user, for example by activating one or more indicator lights, such as the LEDs described above, emitting a sound from a speaker, displaying a message on a display screen on the aerosol provision device 20 or activating a haptic notification means on the aerosol provision device 20. For example, a vibration may be generated by an eccentric rotating mass (ERM) or piezoelectric actuator within the aerosol provision device 20 and/or the consumable 30, or a force may be generated by a motor within the aerosol provision device 20 and/or the consumable 30. As will be appreciated, the notification can be provided to the user by any suitable conveying or indication means.

Alternatively, the notification may be provided on the remote computing device 40, such as on an application installed on the remote computing device 40. For example, a message may be displayed on a display screen on the remote computing device 40, an indicator light activated, a sound emitted from a speaker or a haptic notification means on the remote computing device 40 as described above. The notifications on the computing remote device 40 may be push notifications, or may be a passive notification.

The notification may also provide an indication as to why the image data has not been successfully read, for examples based on the indications generated by the control circuitry 28 or the remote computing device 40 as described above. For example, the notification may indicate that the captured image and corresponding image data does not contain a code. This may indicate to the user to check the consumable for whether a code is present, for example if the consumable has been attached to the aerosol provision device incorrectly such that the code is not in the field of view of the camera, or that the consumable does not contain a code, thereby indicating that the consumable may not be authentic, or the consumable is not designed to be used with the aerosol provision device 20. Alternatively, or in addition, the notification may indicate that a code was detected in the image and corresponding image data, but that the code could not be converted or otherwise decoded. This may indicate to the user that lens of the camera may be dirty, or have become blocked or partially obscured by a foreign body and need cleaning. Alternatively, this may indicate that the consumable is not authentic, and therefore that an alternative consumable should be used.

The notification may indicate to the user to perform one or more actions. For example, such as removing and re-inserting the consumable 30 into the aerosol provision device 20 in the case where a code 33 was unable to be detected in the image, as incorrect insertion of the consumable 30 into the aerosol provision device 20 may have prevented the camera from imaging the code 33, as the code 33 may not have been in the field of view of the camera. Alternatively, the code 33 may have been detect in the image, but not read or otherwise decode because the image was blurred, out of focus, grainy of otherwise unclear. The notification to the user may therefore indicate that the lens of the camera 23 requires a clean, or that the camera 23 and/or aerosol provision device 20 needs to be held more securely or otherwise prevented from moving whilst another image is captured.

The number of times that the operations have previously been performed may be stored as a value in a counter. The control circuitry 28 is then configured to increment the counter by 1 each time the operations are performed. The control circuitry can be configured to reset the counter in response to one or more actions having occurred. For example, the counter may be reset to zero in response to detecting that the consumable 30 has been disconnected or otherwise removed from the interface 22, in response to the image being read successfully, and/or in response to value of the counter equaling the predetermined number of times and a notification being provided to the user of the aerosol provision device 20.

In some examples, the control circuitry 28 is configured to receive an instruction from the remote computing device 40 in response to the sending of the data associated with the image to the remote computing device 40 by the control circuitry 28. In other words, after the control circuitry 28 sends the data associated with the image to the remote computing device the remote computing device 40 may send an instruction to the control circuitry 28.

The instruction may indicate that the consumable 30 is authentic. In this case, the remote computing device 40 is configured to authenticate the consumable following the successful reading of the image data. As described above, reading the image data can comprise detecting and decoding the code in the image to generate numerical values corresponding to the consumable data and the digital signature. Following this, the remote computing device 40 is configured to authenticate the consumable 30 based on the digital signature. The authentication may involve validating the digital signature using a public key of a key pair. As described above, the digital signature is generated using the private key of the key pair. The public key of the key pair is provided to the remote computing device 40, for example as part of an application complied by owner of the private key (the manufacturer of the consumable 30, or by the entity responsible for generating and printing the code 33 on the consumable 30). The public key is then used to validate the digital signature, thereby indicating that the code 33 on the consumable 30 is authentic. In other words, if the remote computing device 40 is unable to validate the digital signature, this indicates that the code was not generated by the owner of the private key (the manufacturer of the consumable 30, or by the entity responsible for generating and printing the code 33 on the consumable 30), and therefore that the consumable 30 comprising the code is not authentic. If the digital signature is validated (in other words, if the digital signature is successfully validated), this indicates that the code was generated by the owner of the private key, and therefore that the consumable comprising the code is authentic. Alternatively, the instruction may indicate that the consumable is not authentic, for example as a result of the remote computing device 40 being unable to valid the digital signature.

The instruction may also indicate that the consumable has not approved. In response to the digital signature being validated, the remote computing device 40 is configured to approve the consumable based on the consumable data, for example by comparing the identifier to a list of identifiers. The list of identifiers may be a list of identifiers for approved consumables 30, such that the consumable 30 is approved if the identifier is present in the list of identifiers. If the identifier is not present in the list of identifiers, the consumable 30 is not approved. Alternatively, the list of identifiers may be a list of identifiers for used consumables such that the consumable 30 is approved if the identifier is not present in the list of identifiers, thereby indicating that the identifier (and corresponding consumable 30) has not been used before. If the identifier is present in the list of identifiers, the consumable 30 is not approved as the identifier (and corresponding consumable 30) has already been used.

In response to receiving the instruction, the control circuitry 28 may be configured to provide a notification to the user of the aerosol provision device 20. For example, where the instruction indicates that the consumable 30 is not authentic, the notification may indicate that the consumable 30 is not authentic, and where in the instruction indicates that the consumable is not approved, the notification may indicate that the consumable 30 is not approved. A notification indicating the consumable 30 is not authentic or not approved may prompt the user to change the consumable 30, for example by removing the consumable 30 from the interface 22 of the aerosol provision device 20 and replacing it with a different consumable 30. The notification may be provided to the user, for example by activating one or more indicator lights, such as the LEDs described above, emitting a sound from a speaker, displaying a message on a display screen on the aerosol provision device 20 or activating a haptic notification means as described above on the aerosol provision device 20. As will be appreciated, the notification can be provided to the user by any suitable conveying or indication means.

In some examples, the control circuitry 28 is configured to alter an operational parameter of the aerosol provision device 20 in response to receiving the instruction from the remote computing device. The operational parameter may be at least one of an amount of power or current delivered from the power source 14 to the aerosol generator 36, an average or maximum temperature of the aerosol generator 36, and a temperature or power profile or setting for the aerosol generator 36. The operational parameters may be at least one setting for one or more indicator lights, speakers, display screens or haptic notification means on the aerosol provision device 20 and/or the consumable 30.

In some examples, the operational parameter is the enabling of the aerosol generator 36 of the aerosol provision system 10. For example, the control circuitry 28 of the aerosol provision device 20 may be configured to disable the aerosol generator 36 (in other words, prevent power or electrical current from being delivered to the aerosol generator 36 from the power source 14) until an instruction is received from the remote computing device 40 indicating that the aerosol generator 36 to be enabled. In response to receiving the notification, the control circuitry 28 is then configured to provide power or electrical current from the power source 14 to the aerosol generator 36, thereby enabling the aerosol generator 36. This ensures that the consumable 30 received by the aerosol provision device 20 cannot be used with the aerosol provision device 20 until the code associated with the consumable has been used to approve the consumable 30. The control circuitry 28 of the aerosol provision device 20 may then be configured to disable the aerosol generator 36 again, for example after the consumable 30 has been detached from the aerosol provision device 20, after a predetermined amount of time or number of puffs on the aerosol provision system 10 by the user, or after the aerosol-generating material 32 has been deleted or otherwise used up. This ensures that any further consumables 30 received by the aerosol provision device 20 will require the same approval process described above before they can be used. In some examples, the enabling of the aerosol generator 36 is for a particular period of time, such as minutes, 1 hour or 24 hours. The control circuitry 28 is then configured to disable the aerosol generator 36 after the period of time has elapsed.

In some examples, the enabling of the aerosol generator 36 is for a number of inhalations by the user of the aerosol provision device 20. In other words, the instruction sent by the computing device 40 to the aerosol provision system 10 indicates to enable the aerosol generator 36 for a particular number of inhalations or puffs, such as 5, 10, 50 or 100. After the user has performed the particular number of inhalations on the aerosol provision system the control circuitry 28 of the aerosol provision device 20 is then configured to disable the aerosol generator 36, thereby requiring the approval process described above to be performed again before the aerosol generator 36 is enabled again. The particular number of inhalations may therefore be selected based on the number of inhalations typically performed by the user on the aerosol provision system 10 in order to use all of the aerosol-generating material 32 in a consumable 30.

Figure 5:
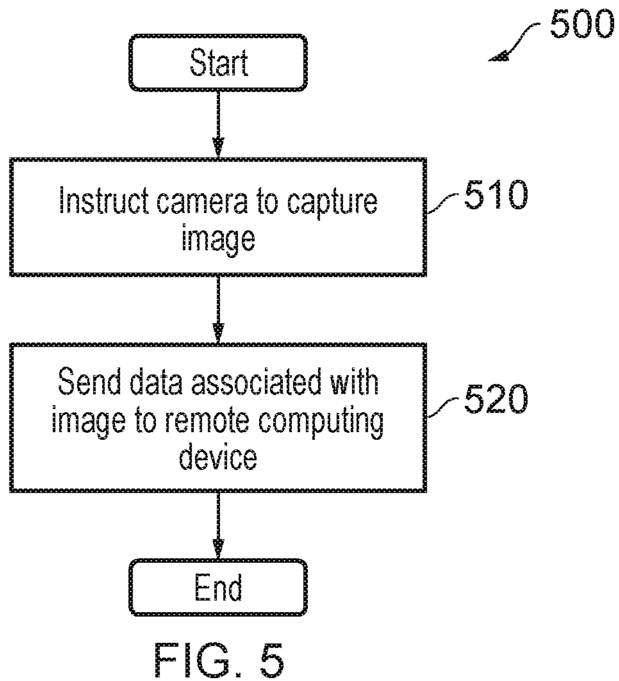
FIG. 5 is a flow chart of a method of imaging a consumable for an aerosol provision system.

FIG. 5 is a flow chart of a method 500 of imaging a consumable 30 for an aerosol provision system 10, for example performed by the control circuitry 28 of the aerosol provision device 20. The method begins at step 510, where a camera 23 is instructed to capture an image of a surface 34 of the consumable 30 in response to the consumable 30 being received by an interface 22. At step 520, data associated with the image is sent to a remote computing device 40. The method then ends.

Figure 6:
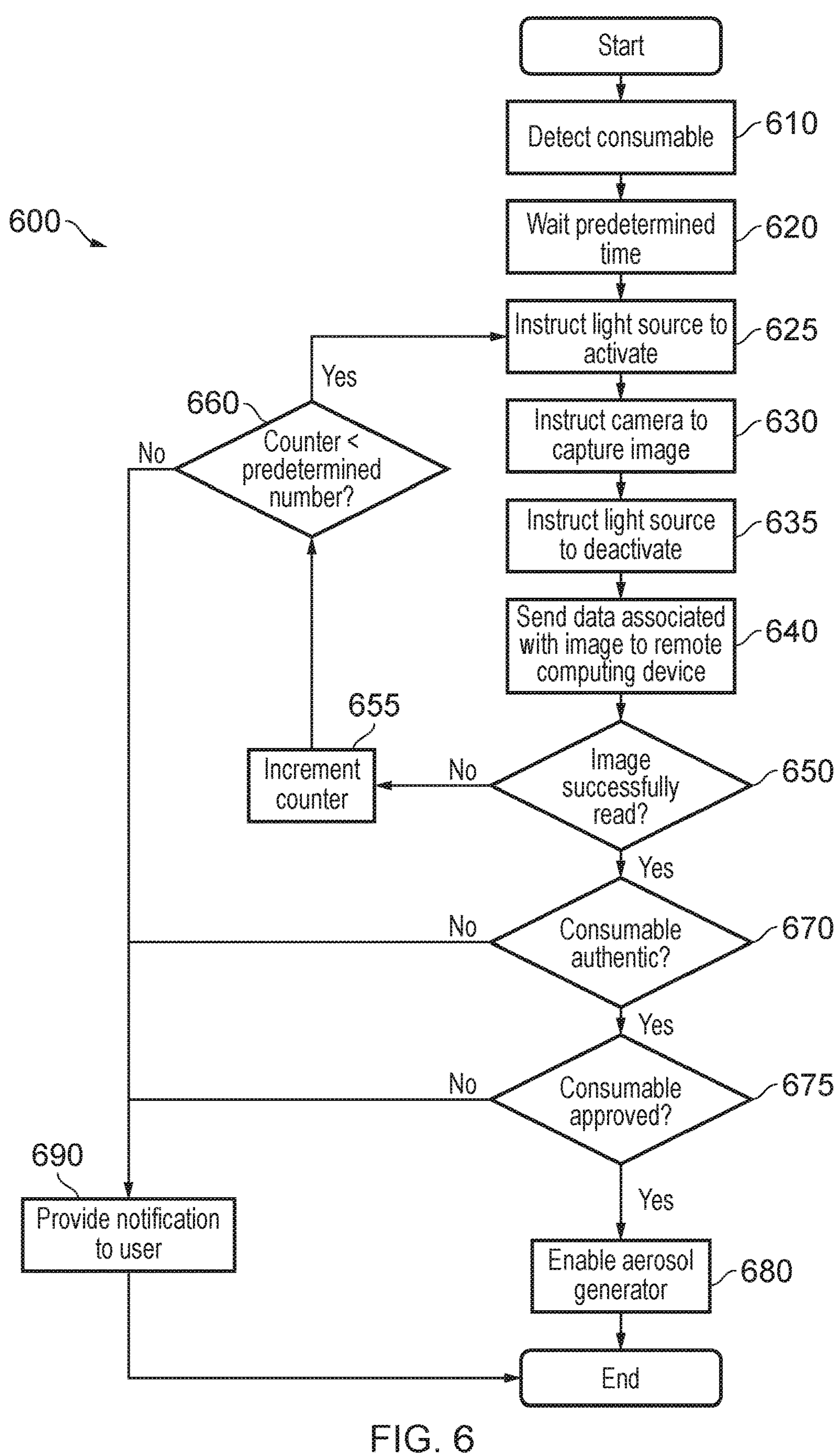
FIG. 6 is flow chart of a further method of imaging a consumable for an aerosol provision system.

FIG. 6 is flow chart of a further method 600 of imaging a consumable 30 for an aerosol provision system 10, for example performed by the control circuitry 28 of the aerosol provision device 20. The method begins at step 610, where a consumable being received by an interface 22 is detected. At step 620, there is a wait of a predetermined time. In other words, the method pauses for the predetermined time, such that the predetermined time is allowed to elapse before the method continues to step 625. At step 625, a light source 25 is instructed to activate, and at step 630 a camera 23 is instructed to capture an image of a surface 34 of the consumable 30, and image data for the image is received from the camera 23. At step 635 the light source 25 is instructed to deactivate. At step 640, data associated with the image is sent to a remote computing device 40. In the method illustrated in FIG. 6, the data associated with the image corresponds to the image data received from the camera. At step 650, it is determined whether the image has been read successfully. In the method illustrated in FIG. 6, an indication is received from the remote computing device 40 that the image was not successfully read. If such an indication is received, it is determined at step 650 that the image was not successfully read, and the method continues to step 655. At step 655 a counter in incremented by 1. The method then continues to step 660, where it is determined whether value of the counter is less than a predetermined number. If the value of the counter is less than the predetermined number, the method returns to step 625. Otherwise, the method continues to step 690, where a notification is provided to the user of the aerosol provision device 20. The method then ends.

If at step 650 it is determined that the image was successfully read, in other words if no indication is received or if an indication that the image was successfully read is received, the method continues to step 670. At step 670, it is determined whether the consumable 30 is authentic. If the consumable 30 is not authentic, an instruction indicating that the consumable 30 is not authentic is received from the remote computing device 40, and the method continues to step 690, where a notification is provided to the user of the aerosol provision device 20. The method then ends.

If at step 670 it is determined that the consumable is authentic, in other words if an instruction indicating that the consumable 30 is not authentic is not received or if an instruction indicating that the consumable 30 is authentic is received from the remote computing device the method then continues to step 675, where it is determined whether the consumable 30 is approved. If the consumable 30 is not approved, an instruction indicating that the consumable 30 not approved is received from the remote computing device 40, and the method continues to step 690, where a notification is provided to the user of the aerosol provision device 20. The method then ends.

If at step 675 it is determined that the consumable is approved, in other words if an instruction indicating that the consumable 30 is not approved is not received or if an instruction indicating that the consumable 30 is approved is received from the remote computing device the method then continues to step 680, where the aerosol generator 36 is enabled. The method then ends.

Figure 7:
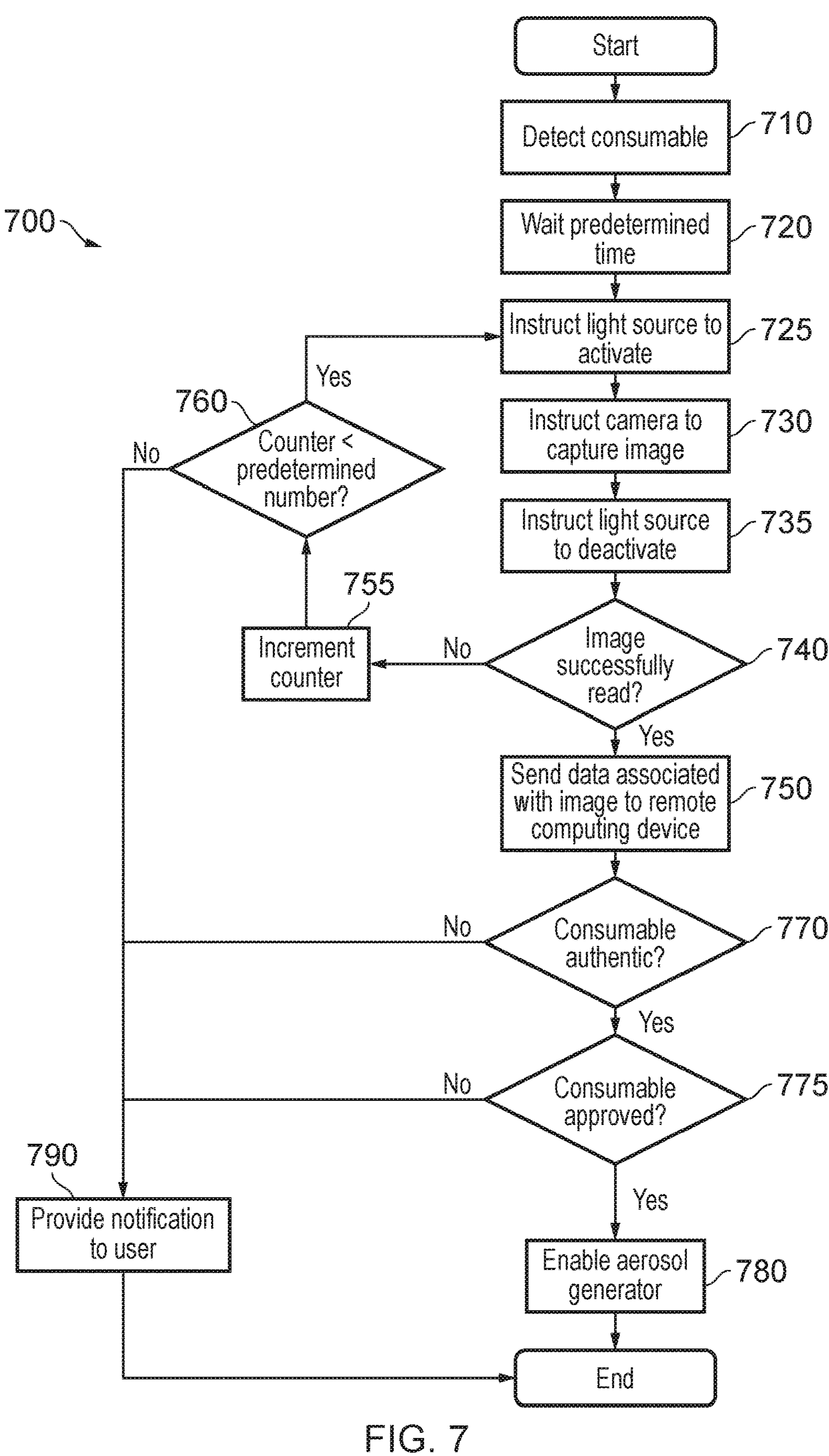
FIG. 7 is flow chart of a further method of imaging a consumable for an aerosol provision system.

FIG. 7 is flow chart of a further method 700 of imaging a consumable 30 for an aerosol provision system 10, for example performed by the control circuitry 28 of the aerosol provision device 20. The method begins at step 710, where a consumable being received by an interface 22 is detected. At step 720, there is a wait of a predetermined time. In other words, the method pauses for the predetermined time, such that the predetermined time is allowed to elapse before the method continues to step 725. At step 725, a light source 25 is instructed to activate, and at step 730 a camera 23 is instructed to capture an image of a surface 34 of the consumable 30, and image data for the image is received from the camera 23. At step 735 the light source 25 is instructed to deactivate.

At step 740, it is determined whether the image has been read successfully. In the method illustrated in FIG. 7, the control circuitry 28 attempts to read the image by performing one or more calculations as described above and determines whether the image has been read successfully. If it is determined that the image was not successfully read, the method continues to step 755. At step 755 a counter in incremented by 1. The method then continues to step 760, where it is determined whether value of the counter is less than a predetermined number. If the value of the counter is less than the predetermined number, the method returns to step 725. Otherwise, the method continues to step 790, where a notification is provided to the user of the aerosol provision device 20. The method then ends.

If at step 740 it is determined that the image was successfully read, the method continues to step 750. At step 750, data associated with the image is sent to a remote computing device 40. In the method illustrated in FIG. 7, the data associated with the image corresponds to the result of one or more calculations performed by the control circuitry 28 on the image data. The method then continues to step 770, wherein it is determined whether the consumable 30 is authentic. If the consumable 30 is not authentic, an instruction indicating that the consumable 30 is not authentic is received from the remote computing device 40, and the method continues to step 790, where a notification is provided to the user of the aerosol provision device 20. The method then ends.

If at step 770 it is determined that the consumable is authentic, in other words if an instruction indicating that the consumable 30 is not authentic is not received or if an instruction indicating that the consumable 30 is authentic is received from the remote computing device the method then continues to step 775, where it is determined whether the consumable is approved. If the consumable 30 is not approved, an instruction indicating that the consumable 30 not approved is received from the remote computing device 40, and the method continues to step 790, where a notification is provided to the user of the aerosol provision device 20. The method then ends.

If at step 775 it is determined that the consumable is approved, in other words if an instruction indicating that the consumable 30 is not approved is not received or if an instruction indicating that the consumable 30 is approved is received from the remote computing device the method then continues to step 780, where the aerosol generator 36 is enabled. The method then ends.

The methods 500, 600 and 700 illustrated in FIGS. 5, 6 and 7 may be stored as instructions on a computer readable storage medium, such that when the instructions are executed by a processor, the methods 500, 600 and 700 described above are performed. The computer readable storage medium may be non-transitory. In other words, the methods 500, 600 and 700 illustrated in FIGS. 5, 6 and 7 may be computer implemented.

As described above, the present disclosure relates to (but it not limited to) an aerosol provision device for an aerosol provision system. The aerosol provision device comprises an interface configured to receive a consumable for the aerosol provision system, a camera configured to image a surface of the consumable and control circuitry. The control circuitry is configured to instruct the camera to capture an image of the surface of the consumable in response to the consumable being received by the interface, and send data associated with the image to a remote computing device.

Thus, there has been described an aerosol provision device for an aerosol provision system, a method of imaging a consumable for an aerosol provision system and an aerosol provision system.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the disclosure, and that other embodiments may be utilized and modifications may be made without departing from the scope of the disclosure. Various embodiments of the disclosure may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An aerosol provision device for an aerosol provision system comprising:

an interface configured to receive a consumable for the aerosol provision system;

a camera configured to image a surface of the consumable; and control circuitry configured to:

instruct the camera to capture an image of the surface of the consumable in response to the consumable being received by the interface, wherein in each instance of the consumable being received by the interface the control circuitry is further configured to wait a predetermined time in response to the consumable being received by the interface prior to instructing the camera to capture the image, the predetermined time set to ensure that any vibration or movement due to or caused by the consumable being received by the interface has ceased or subsided, thereby resulting in reduced motion blur and improved image quality of the surface of the consumable; and send data associated with the image to a remote computing device.

2. The aerosol provision device of claim 1, wherein the camera is located proximate to the interface.

3. The aerosol provision device of claim 1, further comprising a light source configured to illuminate the surface of the consumable.

4. The aerosol provision device of claim 3, wherein the light source is located proximate to the camera.

5. The aerosol provision device of claim 3, wherein the control circuitry is further configured to instruct the light source to activate prior to instructing the camera to capture the image.

6. The aerosol provision device of claim 5, wherein the control circuitry is further configured to wait a predetermined time in response to the consumable being received by the interface prior to instructing the light source to activate.

7. The aerosol provision device of claim 3, wherein the control circuitry is further configured to instruct the light source to deactivate after instructing the camera to capture the image of the surface of the consumable.

8. The aerosol provision device of claim 1, wherein the control circuitry is further configured to repeat the instructing the camera to capture the image one or more times in response to an indication that the image has not been successfully read.

9. The aerosol provision device of claim 1, wherein the control circuitry is further configured to provide a notification to a user of the aerosol provision device in response to an indication that the image has not been successfully read.

10. The aerosol provision device of claim 1, wherein the control circuitry is further configured to store the data associated with the image in memory associated with the control circuitry.

11. The aerosol provision device of claim 1, wherein the control circuitry is further configured to receive an instruction from the remote computing device in response to the sending of the data associated with the image to the remote computing device.

12. The aerosol provision device of claim 11, wherein the instruction indicates that the consumable is not authentic and/or not approved.

13. The aerosol provision device of claim 12, wherein the control circuitry is further configured to provide a notification to a user of the aerosol provision device in response to receiving the instruction indicating that the consumable is not authentic and/or not approved from the remote computing device.

14. The aerosol provision device of claim 11, wherein the control circuitry is further configured to alter an operational parameter of the aerosol provision device in response to receiving the instruction from the remote computing device.

15. The aerosol provision device of claim 14, wherein the operational parameter is the enabling of an aerosol generator of the aerosol provision system.

16. The aerosol provision device of claim 1, wherein the data associated with the image is sent to the remote computing device via Bluetooth.

17. An aerosol provision system comprising the aerosol provision device of claim 1.

18. The system of claim 17, further comprising a consumable, wherein the consumable comprises the code on the surface of the consumable.

19. A method of imaging a consumable for an aerosol provision system comprising:

waiting a predetermined time in response to a consumable being received by an interface in each instance, the predetermined time set to ensure that any vibration or movement due to or caused by the consumable being received by the interface has ceased or subsided, thereby resulting in reduced motion blur and improved image quality of the surface of the consumable;

instructing a camera to capture an image of a surface of the consumable in response to waiting the predetermined time; and sending data associated with the image to a remote computing device.

20. A computer readable storage medium comprising instructions which, when executed by a processor, performs a method of imaging a consumable for an aerosol provision system comprising:

waiting a predetermined time in response to a consumable being received by an interface in each instance, the predetermined time set to ensure that any vibration or movement due to or caused by the consumable being received by the interface has ceased or subsided, thereby resulting in reduced motion blur and improved image quality of the surface of the consumable;

instructing a camera to capture an image of a surface of the consumable in response to waiting the predetermined time; and sending data associated with the image to a remote computing device.

* * * * *